United States Patent [19]

Holt, Jr.

[11] 3,848,139

[45] Nov. 12, 1974

[54] HIGH-GAIN COMPARATOR CIRCUIT

[75] Inventor: James G. Holt, Jr., Mountain View, Calif.

[73] Assignee: Fairchild Camera and Instrument Corporation, Mountain View, Calif.

[22] Filed: Sept. 14, 1973

[21] Appl. No.: 397,494

[52] U.S. Cl. ......... 307/235 R, 330/30 D, 330/38 M
[51] Int. Cl. ........................................ H03k 5/20
[58] Field of Search .... 307/235 R; 330/30 D, 38 M; 328/146, 147

[56] References Cited

UNITED STATES PATENTS 3,694,762 9/1972 Mulder ............................ 330/30 D
3,783,400 1/1974 Gay .................................. 330/30 D

*Primary Examiner*—John Zazworsky
*Attorney, Agent, or Firm*—Alan H. MacPherson; J. Ronald Richbourg

[57] ABSTRACT

A high-gain comparator circuit including a pair of input transistors, a constant current source, a pair of shunting transistors, and a pair of diodes geometrically scaled to corresponding ones of the shunting transistors, all of which are connected to provide a regenerative circuit which produces high slope bilevel output signals at the circuit switching point.

7 Claims, 5 Drawing Figures

HIGH-GAIN COMPARATOR CIRCUIT

BACKGROUND OF THE INVENTION

1. Field of the Invention

This invention generally relates to comparator circuits and, in particular, to a high-gain comparator circuit having geometrically scaled components.

2. Prior Art

Comparator circuits are employed for providing output signals indicative of whether or not an input signal is above or below a given value. Generally, one of the two input terminals of a comparator circuit is connected to a reference voltage for providing the given value and the second input terminal is provided with a signal varying in magnitude with respect to time (commonly referred to as an analog signal). The two output signals from the comparator are at a first and second state, respectively, when the input analog signal is below the reference voltage; and the output signals change to opposite states when the input analog signal is above the reference voltage. That is, the output signals are each bilevel in state. When the two input terminals of the comparator circuit are each provided with analog signals, the bilevel output signals of the comparator circuit change state in response to differences in magnitude of the two input analog signals.

The gain of a comparator circuit, as referred to herein, is the relationship of the input voltage change required for a given output voltage change; which relationship is the slope of the transfer function for the bilevel output signals when changing state. A typical prior art comparator circuit requires a small change of the input voltage to effect a given output voltage change. Even though the input voltage change required in the prior art comparators is small, it is unsatisfactory for many circuit applications requiring high accuracy (i.e., sharp edges on the output waveforms) where the input analog signals may vary slowly in magnitude with respect to time.

Various comparator circuits are known which have a pair of input transistors coupled to one or more current sources. High-gain comparator circuits are also known. However, these high-gain comparators are complex in that several cascaded circuit stages are required for producing the desired high-gain characteristic. One such example is disclosed in U.S. Pat. No. 3,628,059 for "HIGH VOLTAGE FUNCTIONAL COMPARATOR" of Goerge G. Y. Niu, and assigned to the assignee of this application.

SUMMARY OF THE INVENTION

In accordance with this invention, a high-gain comparator circuit comprises a constant current source, two pairs of interconnected transistor switching means, and two diodes cross-coupled to the transistor interconnections for producing bilevel output signals of the comparator circuit in response to differences in the magnitude of slowly varying input signals. The first pair of transistor switching means are coupled to the constant current source for providing variable current flow through these transistors, which variations of current flow are controlled by the magnitudes of the varying input voltages applied to the base terminals of the first pair of transistors. The second pair of transistor switching means are coupled to the outputs of the first pair of transistor switching means for selectively shunting the current from the first pair of transistors to ground potential. The two diodes are cross-coupled to the outputs of the first pair of transistor switching means, and are also coupled to respective ones of the control inputs of the second pair of switching means. The two diodes function as means for developing respective ones of the bilevel output signals, and the state of the bilevel output signals control the shunting of current through the second pair of transistor switching means. One embodiment of this invention employs diodes which are geometrically scaled to respective ones of the second pair of transistor switching means.

Advantages of the present invention are that a comparator circuit is provided which has high gain; is simple in structure; and, is readily fabricated on a single monolithic integrated circuit chip. High gain is achieved in the comparator circuit of this invention by a unique cross-couple connection of the diodes. This cross-couple connection makes the circuit regenerative, which produces high slope bilevel output signals when changing state at the circuit switching point. In addition, geometric scaling of selected circuit components provides either a comparator with high gain, or a comparator with infinite gain and hysterisis; without increasing circuit complexity.

DETAILED DESCRIPTION

Figures 1, 1A:
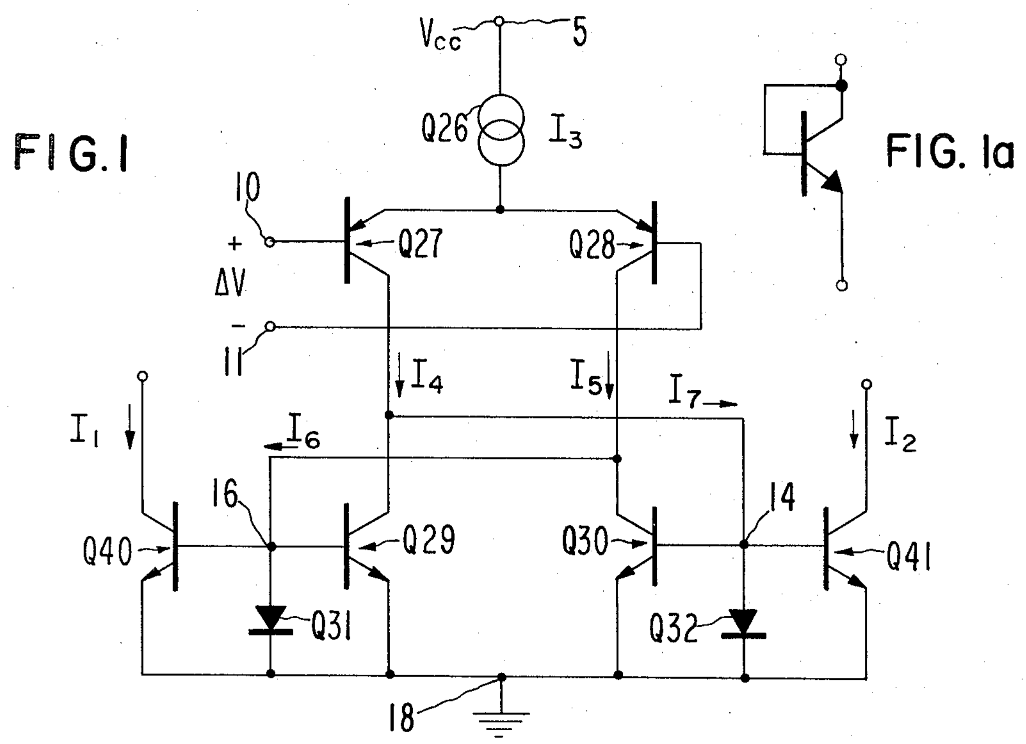
FIG. 1 shows a high-gain comparator circuit constructed in accordance with this invention.
FIG. 1*a* shows a schematic diagram of an alternate diode configuration for use in the circuit shown in FIG. 1, and FIGS. 2*a*–2*c* show graphs of the current transfer function of the high-gain comparator circuit shown in FIG. 1.

With reference to FIG. 1, a current source Q26 is connected between a reference potential Vcc, provided on a terminal 5, and the emitter terminals of a first pair of PNP transistors Q27 and Q28 (although NPN transistors may be used if appropriate modifications well known in the art are used). The current source Q26 supplies a substantially constant current $I_3$. The base terminal of transistor Q27 is connected to an input terminal 10, and the base terminal of transistor Q28 is connected to an input terminal 11. Input terminals 10 and 11 are disposed for receiving two input signals, which control current flow through the transistors Q27 and Q28. One of the input signals may be a reference potential and the second may be an analog signal; or both may be analog signals. The difference in magnitude of the two input signals is designated herein as ΔV. The collector terminals of transistors Q27 and Q28 are connected to collector terminals of a second pair of NPN transistors Q29 and Q30, respectively. The collector terminals of transistors Q27 and Q29 are connected to a circuit junction 14, and the collector terminals of transistors Q28 and Q30 are connected to a circuit junction 16. The base terminals of transistors Q29 and Q30 are connected to the junctions 16 and 14, respectively. The emitter terminals of transistors Q29 and Q30 are connected to a terminal 18. In accordance with one embodiment of this invention, the terminal 18 is connected to ground potential. However, terminal 18 may be connected to a source of negative reference potential for modifying the circuit characteristics. The anode of a diode Q31 is connected to the junction 16, and the cathode thereof is connected to the terminal 18. The anode of a diode Q32 is connected to the junction 14, and the cathode thereof is connected to the terminal 18.

In accordance with one embodiment of this invention, diodes Q31 and Q32 are constructed from transistors having the base and collector leads thereof connected together to enable the transistors to function as diodes. This structure forming diodes Q31 and Q32 enables geometric scaling of the diodes with the transistors Q29 and Q30, respectively, which ensures that the scaled device pairs have substantially the same electrical properties. Transistor Q29 and the transistor forming the diode Q31 are scaled geometrically by selecting transistor functions substantially of the same dimensions, or in a selected ratio, using well-known integrated circuit techniques. Transistor Q30 and the transistor forming diode Q32 are similarly scaled.

Exemplary switching devices, such as transistors Q40 and Q41 may be employed with the circuit of the present invention. If such switching devices are employed, the base terminal of transistor Q40 is connected to the junction 16, and the base terminal of transistor Q41 is connected to the junction 14. The emitter terminals of transistors Q40 and Q41 are connected to the terminal 18. An external current $I_1$ is switched by transistor Q40, and a second external current $I_2$ is switched by the transistor Q41.

The current $I_3$, supplied by the source Q26, is divided between two current flow paths by the transistors Q27 and Q28. The current flowing through transistor Q27 is designated herein as current $I_4$, and the current flowing through transistor Q28 is designated herein as current $I_5$. Since source Q26 supplies substantially constant current $I_3$, then $I_3 = I_4 + I_5$. There are small base currents flowing into the transistors Q27 and Q28, which base currents are negligible and will not be discussed hereafter. The current $I_4$ flows through the transistor Q29 when it is on, or into the junction 14 when transistor Q29 is off. When current $I_4$ is flowing into the junction 14, it is designated herein as current $I_7$. That is, when the transistor Q29 is turned off current $I_7$ is equal to current $I_4$. Likewise, due to symmetry of the comparator circuit, the current $I_5$ flows through the transistor Q30 when it is on, or into the junction 16 when transistor Q30 is off. When current $I_5$ is flowing into the junction 16, it is designated herein as current $I_6$. Current $I_6$ is equal to current $I_5$ when the transistor Q30 is turned off.

When the differential of the signals input $\Delta V$ turns Q27 off and Q28 on, current $I_5$ is equal to the source current $I_3$. That is, all of the current $I_3$ flows through Q28, and current $I_4$ is equal to zero; which results in no current flow into the junction 14 and through diode Q32. Therefore, no potential is developed across Q32 and transistors Q30 and Q41 are turned off. With Q30 off all of the current $I_6$ ($I_6 = I_5$ at this time) flows into the junction 16 and through the diode Q31. A small portion of the current $I_6$ flowing into junction 16 also flows into the base of Q29 for turn-on biasing. A potential is developed across diode Q31, which potential constitutes a first bilevel output signal that turns Q40 on and allows current $I_1$ to flow. Transistor Q29 likewise turns on in response to the first bilevel output signal developed across the diode Q31. However, no current flows through the transistor Q29 since current $I_4$ is equal to zero at this point of the cycle, and transistor Q29 is in saturation.

Figure 2A:
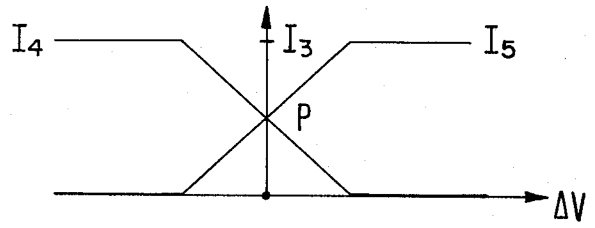

With the same initial conditions as given above, and with a gradual decrease in the magnitude of $\Delta V$; transistor Q27 turns on and passes therethrough a portion of current $I_3$. Current $I_4$ increases with a concomitant decrease in current $I_5$. This is illustrated in FIG. 2*a* by moving to the left along the abscissa of the transfer function graph, which represents a decrease in the magnitude of $\Delta V$. The increasing current $I_4$ flows through the transistor Q29, which is biased on by the first bilevel output signal developed across diode Q31 and the small portion of current $I_6$ flowing into the base of Q29. As current $I_4$ increases, the portion of current $I_6$ flowing through diode Q31 and into the base of Q29 gradually decreases. However, in the early part of the cycle a portion of current $I_6$ continues to flow into the base of the transistor Q29 as a base drive current, which ensures that transistor Q29 will draw the increasing current $I_4$.

When current $I_4$ is equal to current $I_5$, the switching point P (FIG. 2*a*) is reached. The current flowing through transistor Q29 is proportional to the current flowing through diode Q31 since this device pair is geometrically scaled. Therefore, when the current $I_6$ flowing through the diode Q31 decreases, the current flowing through the transistor Q29 proportionably decreases. When the current $I_4$ increases to the point where it exceeds the amount of current that the transistor Q29 is capable of shunting to the terminal 18, some current $I_7$ will flow into the junction 14. Current $I_7$ flowing through the diode Q32 develops a second bilevel output signal which turns the transistor Q30 on to shunt the decreasing current $I_5$ to the terminal 18. Also, the second bilevel output signal turns the transistor Q41 on, which allows the external current $I_2$ to flow. When the transistor Q30 shunts the decreasing current $I_5$ to the terminal 18, the first bilevel output signal drops to zero which turns the transistor Q29 off. This turns the transistor Q40 off, which turns off the flow of the external current $I_1$. At this juncture of the cycle, the circuit reaches a switched state, and will remain in this state so long as the magnitude of current $I_4$ exceeds that of current $I_5$.

Figure 2B:
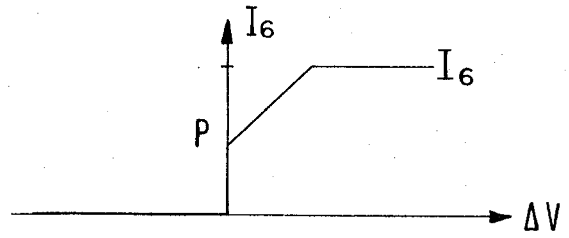
Figure 2C:
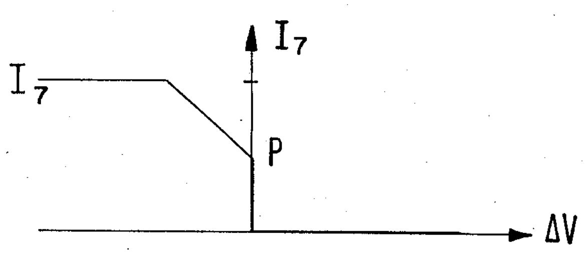

The straight-line approximations shown in FIGS. 2*b* and 2*c* are proportional to the transfer functions for the currents $I_1$ and $I_2$ (which are not shown). The differences in magnitude between the currents $I_6$ and $I_7$, represented by the curves in FIGS. 2*b* and 2*c*, and the currents $I_1$ and $I_2$ are dependent upon the differences in scaling between the transistors Q40 and Q41 and the diodes Q31 and Q32, respectively.

Due to symmetry of the circuit of FIG. 1, the operation of switching back to the opposite state in response to an increase in the magnitude of $\Delta V$ is similar to that described above.

The straight-line approximations of the transfer functions illustrated in FIGS. 2*b* and 2*c* are produced by the comparator circuit when the transistors Q29 and Q30 and the diodes Q31 and Q32 have infinite (or very high) current gain factors. The current gain factor of a transistor is commonly referred to as "beta," and is equal to the ratio of collector current to base current. In practice, the scaling of geometries of the device pairs produces transfer functions of the comparator circuit having a gain which ranges from finite to infinite. When the geometries of the device pairs are made approximately equal, such as Q30 is made slightly larger than Q32 and Q29 is made slightly larger than Q31, the transfer functions illustrated in FIGS. 2*a*–2*c* are produced. Conversely, when Q32 is made slightly larger than Q30, and Q31 is made slightly larger than Q29; the gain of the comparator circuit decreases. Alternatively, when the betas for the transistors Q29 and Q30 and the diodes Q31 and Q32 are decreased, the gain of the comparator circuit decreases.

An hysterisis relationship between the output and input signals can be incorporated in the comparator circuit of this invention by adding resistance in series with the diodes Q31 and Q32. If the added resistances are made equal, the amount of the offsets along the abscissa of the transfer function shown in FIG. 2*a* are equal. Alternatively, hysterisis can be incorporated by scaling Q30 greater than Q32 and Q29 greater than Q31.

What is claimed is:

1. A high-gain comparator circuit producing first and second bilevel output signals in response to differences in magnitude of first and second input signals, said circuit comprising:

a. a current source means coupled to a first reference potential for producing a substantially constant current $I_3$;

b. first and second switching means coupled to said source means for passing variable currents $I_4$ and $I_5$, respectively, wherein $I_3 = I_4 + I_5$, each of said first and second switching means possessing an output terminal, and each possessing a control input terminal for receiving a respective one of said first and second input signals;

c. third and fourth switching means having input terminals coupled to the output terminals of said first and second switching means for receiving said currents $I_4$ and $I_5$, respectively, each of said third and fourth switching means possessing an output terminal coupled to a second reference potential and each possessing a control input terminal cross-coupled to the output terminals of said second and first switching means, respectively;

d. first means coupled between the control input terminal of said third switching means and said second reference potential for developing said first bilevel output signal in response to said current $I_5$, wherein said first bilevel output signal controls shunting of said current $I_4$ through said third switching means to said second reference potential; and e. second means coupled between the control input terminal of said fourth switching means and said second reference potential for developing said second bilevel output signal in response to said current $I_4$, wherein said second bilevel output signal controls shunting of said current $I_5$ through said fourth switching means to said second reference potential.

2. A circuit as defined in claim 1, wherein said first means is a transistor having base and collector terminals connected together for enabling said first transistor to function as a diode.

3. A circuit as defined in claim 2, wherein said third switching means is a third transistor geometrically scaled to said first transistor.

4. A circuit as defined in claim 1, wherein said second means is a second transistor having base and collector terminals connected together for enabling said second transistor to function as a diode.

5. A circuit as defined in claim 4, wherein said fourth switching means is a fourth transistor geometrically scaled to said second transistor.

6. A circuit as defined in claim 1 further including a fifth switching means having an input disposed for receiving an externally supplied current $I_1$ and a control input coupled to the junction between said first means and said third switching means to enable said current $I_1$ to flow through said fifth switching means in response to the magnitude of said first bilevel output signal.

7. A circuit as defined in claim 1 further including a sixth switching means having an input disposed for receiving an externally supplied current $I_2$ and a control input coupled to the junction between said first means and said third switching means to enable said current $I_2$ to flow through said sixth switching means in response to the magnitude of said second bilevel output signal.

* * * * *